Nov. 30, 1948. H. L. BOWDITCH 2,455,326
MECHANISM FOR MOVING MOVABLE MEMBERS
Filed April 9, 1946

INVENTOR.
Hoel L. Bowditch.
BY
Blair, Curtis & Hayward
ATTORNEYS.

Patented Nov. 30, 1948

2,455,326

UNITED STATES PATENT OFFICE 2,455,326

MECHANISM FOR MOVING MOVABLE MEMBERS

Hoel L. Bowditch, Sharon, Mass., assignor to The Foxboro Company, Foxboro, Mass., a corporation of Massachusetts Application April 9, 1946, Serial No. 660,644

8 Claims. (Cl. 74—10)

This invention relates broadly to mechanism for moving a movable member and more particularly to mechanism for adjusting a movable control element of an automatic controller to adjust the control point setting of the controller or for positioning an index pointer indicating the value of a variable condition such as pressure, temperature and the like, or for simultaneously positioning such a control element and index pointer.

In a conventional recording controller it is the usual practice to mount an index pointer within the instrument casing in such manner that it cooperates with the recording chart to indicate the value of the controlled condition for which the instrument is set. It is also usual to provide a movable control element that may be adjusted to adjust the control point setting of the controller. It is desirable, although not essential, that the index pointer and control element be interconnected so that they may be simultaneously moved to the desired positions. Adjustment of the index pointer and control element is usually effected manually through an appropriate mechanism.

The mechanisms heretofore proposed for effecting adjustment of such an index pointer and/or control element have in general been either unduly complicated in construction or incapable of positioning the index pointer or control element with the desired accuracy. It is desirable that such a mechanism be simple in construction and that it be capable of moving the elements to be positioned in a smooth and continuous manner precisely to the desired location. Further, it should provide a reasonably fine adjustment to yield desired accuracy.

It is accordingly an object of the present invention to provide an improved mechanical movement for manually setting an index pointer and/or control element in accordance with a predetermined value of a condition. It is a further object of the invention to provide a mechanism of this type that is simple in construction and smooth and certain in operation. It is still another object of the invention to provide an improved mechanism for moving a movable member, particularly where the movable member is to be rotated about an axis to a desired position. Other objects of the invention will be in part obvious and in part pointed out hereinafter.

The many objects and advantages of the present invention may best be appreciated by reference to the accompanying drawing which illustrates a preferred embodiment of the mechanism of the present invention mounted in operative position in a pneumatic recorder controller. In the drawing.

Figure 1:
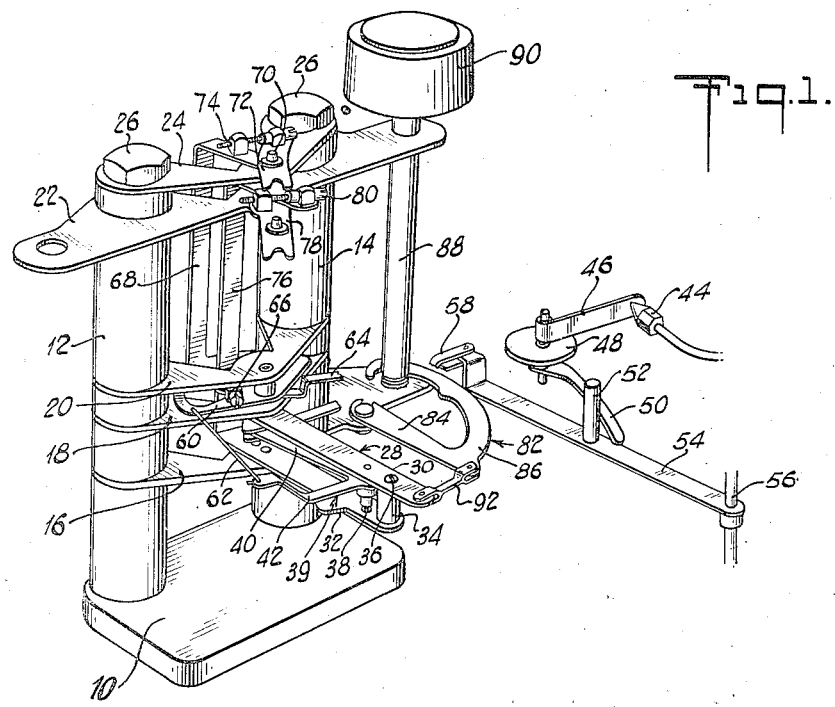
Figure 1 is a perspective view of a mounting for the recording pen of a recorder controller and shows the relationship of the present mechanism thereto. The mechanism is normally mounted within the casing of the instrument in such manner that the pen is in a vertical plane.

Referring to the drawing and more particularly to Figure 1, the numeral 10 designates a plate that is normally mounted on the rear vertical wall of the casing of the control instrument. From the plate 10 two posts 12 and 14 extend horizontally forward into the instrument casing and serve as a mounting for a series of supporting plates 16, 18, 20, 22 and 24. The plates 16 to 24 are separated by suitable spacers and the entire assembly is held together by the bolts 26 which pass through the plates and spacers and are threaded into the plate 10. Pivotally mounted between the plates 16 and 18 there is a U-shaped bracket 28 comprising an upper arm 30 pivoted to the underside of plate 18, a lower arm 32 pivoted to the upper side of plate 16 and a post 34 which cooperates with the screw 36 to clamp together the outer ends of the arms 30 and 32. Freely pivoted within the bracket 28 parallel to post 34 there is an arbor 38 that supports a bell crank lever 39 comprising the arm 40 that is approximately parallel with the bracket and the arm 42 that extends approximately at right angles to the bracket.

The arm 40 of bell crank 39 is effectively connected to a control element of the controller. Referring to the right-hand portion of Figure 1, the numerals 44 and 46 designate a conventional nozzle and baffle of the type commonly used in pneumatic control instruments, the baffle 46 being urged against the nozzle 44 by a spring 48. The baffle 46 may be moved away from the nozzle 44 by counterclockwise rotation of a lever 50. The baffle and nozzle cooperate in known manner to regulate, through intermediate apparatus, the flow of an agent affecting a process variable such as temperature that is to be controlled. Movement of the baffle 46 relative to the nozzle 44 is effected by post 52 which engages lever 50 and is fixed to a lever 54 that is pivotable about a fixed pivot 56. The upper end of lever 54 is connected by a link 58 to the upper end of arm 40 and thus rotation of arm 40 produces movement of the baffle 46 with respect to nozzle 44.

The arm 42 of the bell crank 39 is effectively connected in the following manner to a conventional responsive element (not shown) responsive to the value of the variable condition, i. e., temperature, which is being controlled. Rotatably mounted on the rear face of plate 20 there is a sector 60 which is connected by a link 62 to the lever 62. Extending downwardly from the sector 60 and in normally fixed relationship thereto, there is a lever 64 which is connected by a mechanism (not shown) to the temperature responsive element of the controller. Adjustment of the relationship between the lever 64 and sector 60 is provided by an adjustment screw 66. In operation, the temperature responsive element in response to changes in temperature rotates lever 64 and its associated sector 60 and through link 62, arms 42 and 40 of bell crank 39, link 58, lever 54, post 52 and lever 50 positions the baffle 46 in accordance with the measured value of the variable condition.

Mechanism is also provided for continuously recording the value of the measured temperature. Extending forwardly from the rotatable sector 60 there is a bracket 68 that is pivotally connected to the plate 24 at 70. Connected to the bracket 68 at its forward end there is an extension 72 that is pivotally mounted in such manner that it may be angularly adjusted with respect to the bracket 68 by means of a fine screw adjustment 74. The extension 72 carries a recording pen (not shown) which cooperates with a chart to record continuously the measured temperature.

Connected to the upper end 30 of bracket 28 there is a forwardly extending arm or bracket 76 which at its forward end is pivotally connected to the plate 22. The bracket 76 has connected thereto an extension 78 similar to the extension 72 and the extension 78 may be angularly adjusted with respect to the bracket 76 by a screw adjustment 80 similar to the adjustment 74. The extension 78 carries an index pointer (not shown) that cooperates with the recording chart to indicate the value of the temperature for which the controller is set. As the bracket 28 is rotated, extension 78 and its associated pointer are moved to indicate the value of the temperature for which the controller is set. Simultaneously, arm 40 of bell crank 39 is rotated about its arbor 38 to cause link 58 and lever 54 to change the position of baffle 46. Thus rotation of bracket 28 simultaneously adjusts the position of baffle 46 to alter the control point setting of the controller and the position of the index pointer to indicate the new value of the control point setting.

Figure 2:
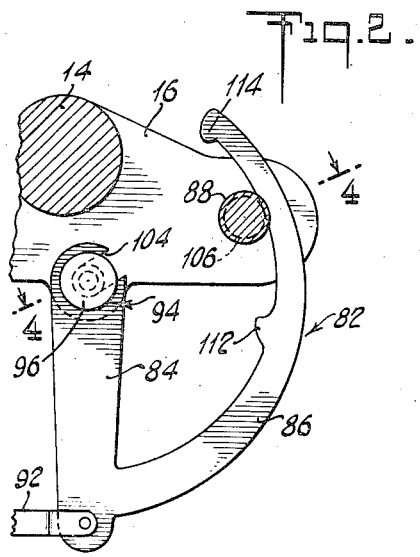
Figure 2 is a vertical section taken on the line 2—2 of Figure 1 and provides a front view of the way in which the pivoted lever of the manually operable adjusting mechanism is mounted.
Figure 3:
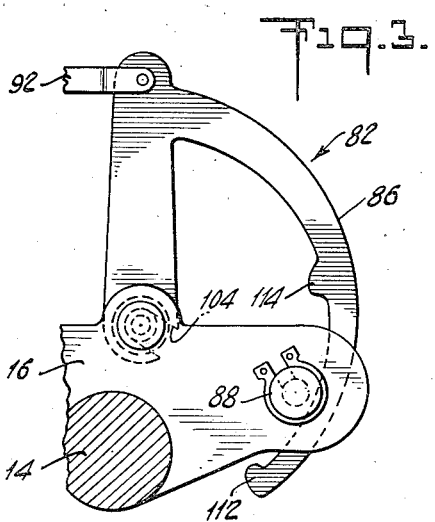
Figure 3 is a rear view showing the way in which the pivoted lever is mounted on its supporting plate.

Adustment of the position of bracket 28 may be conveniently effected by manually operable mechanism now to be described. Referring to Figures 1, 2 and 3 there is mounted on the plate 16 a lever 82 having a straight arm 84 and an arcuate arm 86, the center of curvature of the arcuate arm 86 being approximately coincident with the pivot point of the lever 82. The arcuate arm 86 of lever 82 frictionally and resiliently engages a rotatable shaft 88 that is mounted in the plates 16 and 22 and is provided at its forward end with a knob 90 for manual rotation of the shaft. The lower end of the straight arm 84 of lever 82 is connected by a link 92 to the lower end of bracket 28 and thus rotation of the knob 90 causes lever 82 to produce rotational movement of the bracket 28. The construction is such that bracket 28 and arm 84 remain substantially parallel when shaft 88 is rotated and thus equiangular movements of shaft 88 produce equiangular movements of bracket 28.

Figure 4:
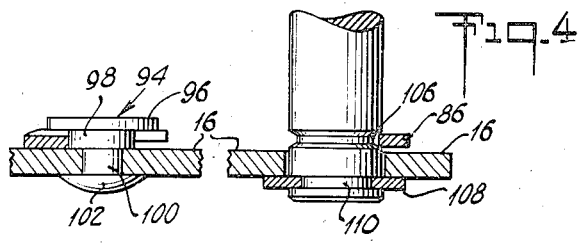
Figure 4 is a section taken on the line 4—4 of Figure 2 and showing the construction of the fixed pivot for the pivoted lever and the relationship between the rotatable shaft and the lever.

The mounting of lever 82 in plate 16 is best shown in Figures 2, 3 and 4 of the drawing. Passing through the plate 16 there is a rivet 94 comprising a head 96, a bearing surface 98, a shank 100 of reduced cross-sectional area that fits into a hole in the plate 16 and the peened portion 102 of the rivet that holds it in place. The upper end of arm 84 of lever 82 is provided with a slot 104 that permits the lever to be slipped over the bearing surface 98 of rivet 94, the axis of slot 104 being approximately coincident with the line of centers of rivet 94 and shaft 88. The head 96 of rivet 94 and the plate 16 effectively provide retaining members to hold the lever 82 against lateral movement. The upper tip of arm 84 is slightly bent as best shown in Figure 4 in such manner that the lever bears resiliently against the confronting surfaces of head 96 and plate 16 and thus in effect forms its own spring washer. The amount of bending of the tip of arm 84 is exaggerated in Figure 4.

The portion of shaft 88 just in front of plate 16 is provided with a wedge-shaped groove 106 that engages the inner edge of arcuate arm 86. Shaft 88 is so positioned with respect to the rivet 94 that the lever 82 is slightly deformed or stretched in such manner that the natural resilience of the lever holds the lever in engagement with the bearing surface 98 of rivet 94 and causes the inner edge of arcuate arm 86 to bear against the shaft 88 and remain in frictional engagement with the wedge-shaped groove 106. Shaft 88 is held against axial movement by a washer 108 which is located just behind the plate 16 and fits into a groove 110 near the rear end of shaft 88. The arcuate arm 86 of lever 82 is provided with a pair of projections 112 and 114 that limit the movement of the arm that can be produced by rotation of shaft 88.

In order to provide desired smoothness of operation of the positioning mechanism the arcuate arm 86 is preferably given a contour slightly different from that of a true circular arc. If the inner edge of arcuate arm 86 is a true circular arc the force urging the arm 86 into the groove 106 is greater at points near the projection 114 than at points near the projection 112. Thus if arm 86 is a true circular arc and if shaft 88 is so positioned with respect to pivot 94 as to produce desired tension in the arm 86 when the shaft 88 engages the arm at a point near projection 112, the tension of arm 86 when it engages shaft 88 near projection 114 may be excessive and cause undesired binding. For this reason the arm 86 is preferably distorted from the true arc of a circle to an extent sufficient to provide equal tension at all points between the projections 112 and 114 and thus give smooth, uniform operation throughout its effective range of movement.

The operation of the mechanism described above should be largely apparent from the foregoing description. Manual rotation of the knob 90 simultaneously positions a control element of the controller to adjust the control point setting of the controller and an index pointer to indicate the value of a controlled condition for which the controller is set. By adjustment of knob 90, shaft 88 is rotated and because of the frictional engagement between arcuate arm 86 and shaft 88, lever 82 is rotated to rotate through link 92 the bracket 28. Since the index pointer is effectively connected to the bracket 28 it is positioned by movement of the bracket 28. It may be noted that motion of the knob 90 produces motion of the index pointer in the same direction, i. e., clockwise movement of the knob produces clockwise movement of the index pointer and vice versa. Further, rotation of bracket 28 causes arm 40 of the bell crank 39 to rotate about its arbor 38 and thus through link 58, lever 54, post 52 and lever 50 position baffle 46.

The mechanism for moving the bracket 28 is both simple in construction and effective in operation. The shaft 88 may be manually rotated to adjust smoothly and accurately the control point setting of the controller. Assembly of the mechanism may be accomplished by simply slipping the slot 104 of lever 82 over the bearing surface 98 of rivet 94 and passing the free end of arcuate arm 86 around the shaft 88. The natural resilience of the lever 82 forces the arcuate arm 86 into contact with the wedge-shaped groove 106 to provide a firm and reliable frictional contact between the shaft 88 and arm 86. The projections 112 and 114 of the arm 86 keep the adjustment within predetermined limits. Since the diameter of shaft 88 is small relative to the radius of curvature of the arm 86, a reasonably fine adjustment of the control point setting may be achieved.

Since many embodiments might be made of the present invention and since many changes might be made in the embodiment disclosed herein, it is to be understood that the foregoing description is to be interpreted as illustrative only and not in a limiting sense.

I claim:

1. Mechanism for moving a movable member comprising, in combination, a fixed pivot, a lever effectively connected to said member, said lever having a slot in one end thereof adapted to engage said fixed pivot and having at its other end an arcuate arm, the center of curvature of which is approximately coincident with the center of said pivot and a rotatable shaft engaging the inner edge of said arcuate arm and so positioned with respect to said pivot as to distort said lever slightly, whereby the natural resilience of said lever holds said arcuate arm against said shaft and holds the slotted end of said lever in engagement with said pivot.

2. Mechanism for moving a movable member comprising, in combination, a fixed pivot, a lever effectively connected to said member, said lever having a slot in one end thereof adapted to engage said fixed pivot and having at its other end an arcuate arm, the center of curvature of which is approximately coincident with the center of said pivot, and a rotatable shaft engaging the inner edge of said arcuate arm and so positioned with respect to said pivot as to distort said lever slightly whereby the natural resilience of said lever holds said arcuate arm against said shaft and holds the slotted end of said lever in engagement with said pivot, said fixed pivot including a pair of retaining members for preventing lateral movement of said lever and the slotted end of said lever being slightly bent to cause said lever to bear resiliently against the confronting surfaces of said retaining members.

3. Mechanism for angularly positioning a rotatable lever, said mechanism comprising a pivoted lever having a straight arm substantially parallel to said rotatable lever and effectively connected thereto and having an arcuate arm extending from said straight arm at a point spaced from the pivot point of said pivoted lever, the center of curvature of said arcuate arm being approximately coincident with the pivot point of said lever, and a rotatable shaft so positioned with respect to said pivot point that said lever is distorted to an extent sufficient to cause the natural resilience of said pivoted lever to hold said arcuate arm in resilient and frictional engagement with said shaft, whereby rotational movements of said shaft produce rotational movements of said rotatable lever.

4. Mechanism for moving a movable member comprising, in combination, a pivoted lever effectively connected to said member and having an arcuate arm, the center of curvature of which is approximately coincident with the pivot point of said lever, said arcuate arm having a free end spaced from the pivot point of said pivoted lever, and a rotatable shaft engaging said arcuate arm and so positioned with respect to said pivot point as to distort said lever slightly, whereby the natural resilience of said lever holds said arcuate arm in frictional engagement with said shaft and rotation of said shaft causes said lever to move said movable member.

5. Mechanism for moving a movable member comprising, in combination, a pivoted lever effectively connected to said member and having an arcuate arm, the center of curvature of which is approximately coincident with the pivot point of said lever, said arcuate arm having a free end spaced from the pivot point of said pivoted lever, a rotatable shaft engaging the inner edge of said arcuate arm and so positioned with respect to said pivot point as to distort said lever slightly, whereby the natural resilience of said lever holds said arcuate arm in frictional engagement with said shaft and rotation of said shaft causes said lever to move said movable member.

6. Mechanism for moving a movable member comprising, in combination, a pivoted lever effectively connected to said member and having an arcuate arm, the center of curvature of which is approximately coincident with the pivot point of said lever, said arcuate arm having a free end spaced from said pivot point, and a rotatable shaft engaging the edge of said arcuate arm and so positioned with respect to said pivot point as to distort said lever slightly, said arcuate arm being provided with a pair of spaced projections that limit the movement of said arm with respect to said shaft, whereby rotation of said shaft within predetermined limits causes said lever to move said movable member.

7. Mechanism for positioning an index pointer of an automatic controller to indicate the value of a controlled condition for which said controller is set, said mechanism comprising a pivoted lever effectively connected to said pointer and having an arcuate arm, the center of curvature of which is approximately coincident with the pivot point of said lever, said arcuate arm having a free end spaced from said pivot point, and a rotatable shaft engaging an edge of said arcuate arm and so positioned with respect to said pivot point as to distort said lever slightly, whereby the natural resilience of said lever holds said arcuate arm in frictional engagement with said shaft, and rotation of said shaft causes said lever to position said index pointer.

8. Mechanism for positioning an index pointer of an automatic controller to indicate the value of a controlled condition for which said controller is set, said mechanism comprising a pivoted lever effectively connected to said pointer and having an arcuate arm, the center of curvature of which is approximately coincident with the pivot point of said lever, said arcuate arm having a free end spaced from said pivot point, and a rotatable shaft having a wedge-shaped peripheral groove engaging the inner edge of said arcuate arm and so spaced from the pivot point of said lever that said lever is distorted slightly, whereby the natural resilience of said lever holds said arcuate arm in frictional engagement with said wedge-shaped groove, and rotation of said shaft causes said lever to move said index pointer.

HOEL L. BOWDITCH.

REFERENCES CITED

The following references are of record in the file of this patent:

UNITED STATES PATENTS

| Number | Name | Date |
|---|---|---|
| 1,841,941 | Elliott | Jan. 19, 1932 |
| 1,889,781 | Goubert | Dec. 6, 1932 |
| 1,928,310 | De Jur | Sept. 26, 1933 |
| 2,051,438 | Dwyer | Aug. 18, 1936 |
| 2,294,869 | Buechmann | Sept. 1, 1942 |